Oct. 7, 1969  J. R. PARKS  3,471,831
ELECTRONIC SYSTEMS AND ARRANGEMENTS FOR RECOGNISING
PRINTED CHARACTERS
Filed Dec. 28, 1964  6 Sheets-Sheet 1
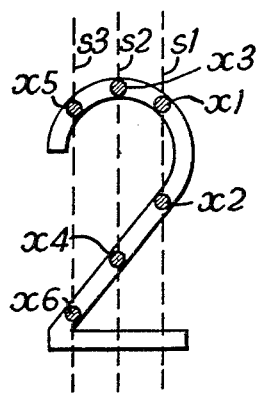
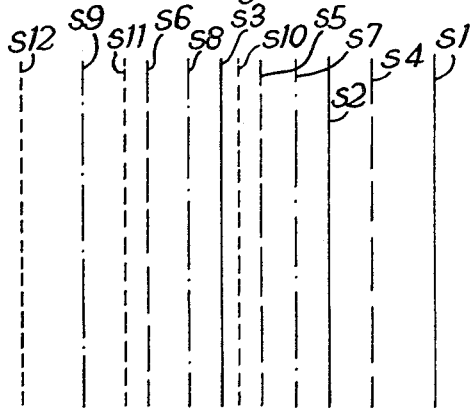
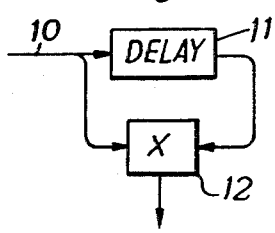
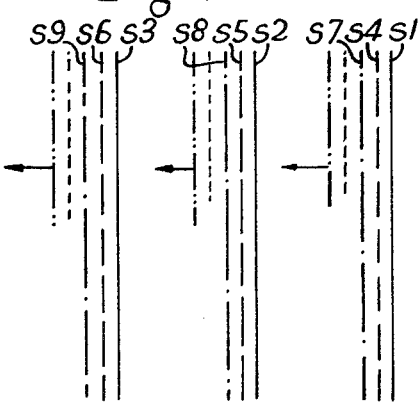
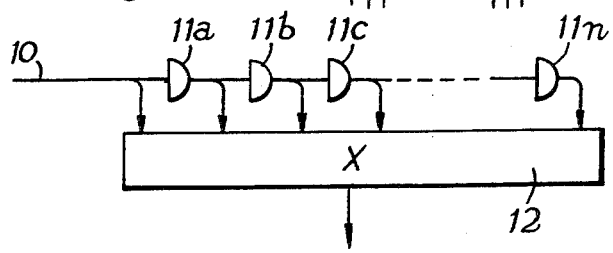
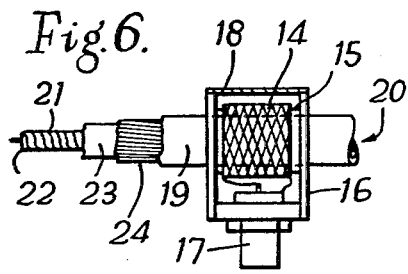
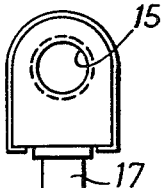
INVENTOR
John Ronald Parks
Cushman, Darby & Cushman
ATTORNEYS

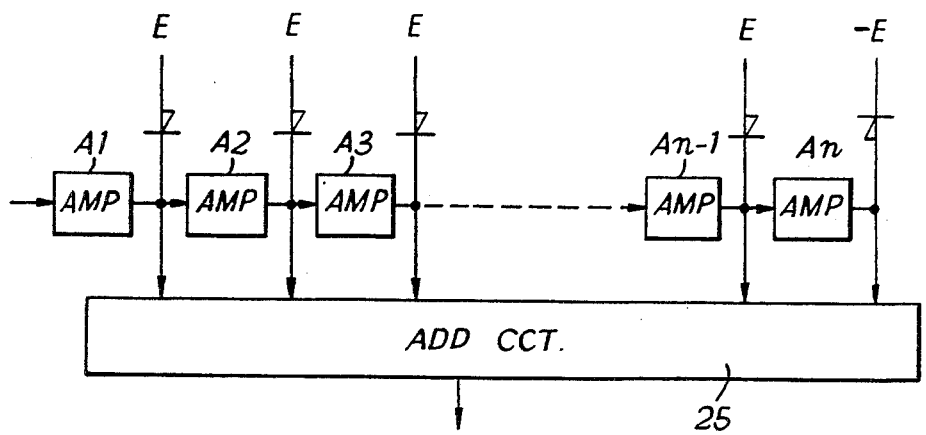
Fig. 10.
Fig. 15.
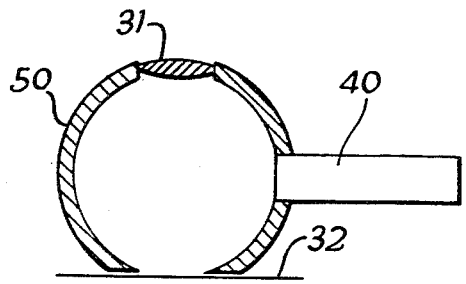
Fig. 16.
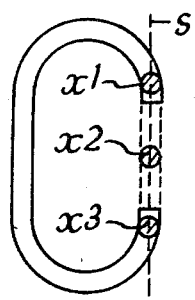

Fig. 11.

United States Patent Office

3,471,831
Patented Oct. 7, 1969

3,471,831
ELECTRONIC SYSTEMS AND ARRANGEMENTS FOR RECOGNISING PRINTED CHARACTERS
John Ronald Parks, Teddington, England, assignor to National Research Development Corporation, London, England, a British corporation
Filed Dec. 28, 1964, Ser. No. 421,314
Int. Cl. G06k 9/02, 9/08
U.S. Cl. 340—146.3     14 Claims

ABSTRACT OF THE DISCLOSURE

Printed character recognition system in which the character-containing field is scanned by a light spot and an analogue-form electric signal representing the differing optical characteristics of the examined character and its backbround is derived through photoelectric means, a plurality of chosen differently time-delayed versions of said signal being then multiplied together to form auto-correlation function signals indicative of the presence or absence of different geometric features within the examined character for subsequent examination in different combinations in logical circuit means to identify the examined character.

---

This invention relates to electronic systems and arrangements for effecting recognition of printed characters, such as the printed numerals provided by various accounting, office and like mechanisms, for example, a cash register.

Hitherto, the recognition by electronic means of such printed characters has demanded the use of a particular style of character especially created for automatic recognition and printed with high quality and with close tolerances. A precise character printing of this nature is not normally available from ordinary forms of accounting and like mechanisms and it is an object of the present invention to provide an improved system and arrangement by which recognition can be effected of any character within a range according to a particular single chosen style and having the quality of printed image normally provided by current accounting, office and like mechanisms.

In accordance with the invention the character to be recognised is scanned, for instance, by a flying light spot, over a predetermined, for instance, raster-like, pattern comprising a plurality of spaced lines and auto-correlation of the output signals arising at different positions along the scan path is effected by comparing or multiplying together at least two versions of the output signal waveform due to the scanning operation after delaying one waveform by a predetermined amount with respect to the other.

In order that the nature of the invention may be more readily understood a number of embodiments thereof will now be described by way of illustrative example only and with reference to the accompanying drawings in which:

FIGURE 1 is a diagram illustrating the operation of examining a character by a scanning process.

FIGURES 2 and 3 are diagrams illustrating alternative forms of a raster-like scanning cycle for effecting examination of an area within which the character is located.

FIGURE 4 is a block schematic diagram showing one arrangement for obtaining a two-term auto-correlation function.

FIGURE 5 is a block schematic diagram showing an arrangement for obtaining a multi-term auto-correlation function.

FIGURES 6 and 7 are side and end views of an arrangement for tapping off signals from a particular and preferred form of delay line cable.

FIGURE 10 is a block schematic diagram of one form of logarithmic amplifier conveniently employed for supplying the signal input to the delay line devices in effecting auto-correlation.

FIGURE 11 is a block schematic diagram of an arrangement for effecting scanning and subsequent auto-correlation of the derived signals in the recognition of printed numerals.

FIGURE 15 is a diagram illustrating a modified optical arrangement for effecting scanning of the character under recognition.

FIGURE 16 is a diagram, similar to FIG. 1 illustrating a slightly modified operation of examining a character by the same basic scanning process.

Figure 8:
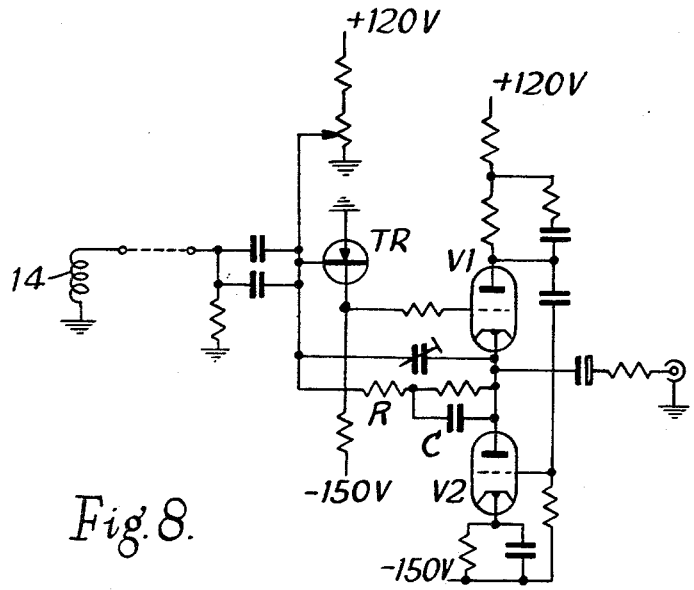
FIGURE 8 is a circuit diagram of a pick-off coil amplifier for receiving signals from an arrangement as shown in FIGS. 6 and 7.

Referring first to FIG. 1, the numeral "2" is shown as scanned by a flying light spot moving over the three successive and parallel rectilinear paths or lines $s1$, $s2$, and $s3$ with the usual, more rapid, flyback (not shown) between the respective line scans. With the aid of suitable photoelectric sensing means a discernable signal output can be obtained upon the passage of the moving light spot over the different parts of the character which coincide with points on the different line scans as indicated by points $x1$ and $x2$ on the first scan $s1$, points $x3$ and $x4$ on the second scan $s2$ and the points $x5$ and $x6$ on the third scan $s3$. If the signal due to the scanning of point $x1$ is delayed by a chosen time interval so that it coincides in time with the signal due to the scanning of point $x5$, and if the signal due to the scanning of point $x3$ is also delayed by a time interval such that it also coincides in time with the same signal resulting from the scanning of point $x5$, the combination of these three signals, as by multiplying them together, can be arranged to provide a substantial amplitude output only when the raster scan is effected upon a character having a geometrical feature in the form of a curved region such as that of the upper part of the numeral "2" as shown. In similar manner, if the signal due to the scanning of point $x2$ is delayed with respect to the signal due to the scanning of point $x6$ so that the two coincide in time and if the signal due to the scanning of point $x4$ is likewise so delayed in time that it coincides also with the signal due to the scanning of point $x6$, then the combination of these three signals, as by multiplying them together, will likewise provide a substantial amplitude output only when the character being scanned has as a geometrical feature thereof a rectilinear and inclined region such as shown for the inclined middle limb portion of the numeral "2." Features of other geometrical shapes can be dealt with in like manner by appropriate alteration of the respective delay times.

The output signals resulting from the combination of the various delayed and undelayed or differently delayed scan output signals constitute auto-correlation function signals which may be applied to suitable logical circuits and/or computing apparatus so that a recognition signal indicative of the numeral "2" will be given only when the said curved and the said inclined linear portions are identified simultaneously. Clearly by further simple extension of the principle other colinear and non-colinear displacements of any orientation defining different characteristically shaped portions of a character may be identified in like manner. For example, a vertical linear element may be identified by multiplying together a number of scan output signals which are only slightly delayed relative to one another and which will provide a significant output when multiplied together only when the scanning light spot path coincides with the linear direction of the said vertical linear element during the time of one scan line.

The same basic principle as described above may be extended to detect the specific absence of any character portion or character feature at some particular position within the character outline or area. Such a facility is of use in differentiating between characters which otherwise have general similarity such as the letters C and O or the numerals 3, 6, 8 and 9, especially with some frequently encountered type styles. Thus, referring to FIG. 16, it will be apparent that the letters C and O will give the same, positive, result so far as tests for curved upper and lower portions and also for a vertical linear element. The presence of the gap in the right-hand vertical linear may be positively identified by use of the inverse or NOT technique of the computer art by delaying the signal due to the scanning of point $x1$ with respect to the signal due to the scanning of point $x3$ so that the two coincide in time and also delaying an inverse version of the signal due to the scanning of point $x2$ so that this also coincides in time with the signal due to point $x3$. By such inverse version is meant a signal which is at an operative level when no character image is being sensed by the photo-electric sensing means and which drops to a low level or even zero when any image area is being sensed by such sensing means. Such an inverted or NOT form of signal may be obtained by any of the means, e.g., an inverter circuit, well known in the computer art.

The arrangement of this invention has the advantage that, as it is the relative delay of the separately multiplied signals each obtained during the raster-like scan period which determines their ultimate effect in producing a recognition output signal, the actual position of the character within the scanned area is relatively unimportant if the said raster-like pattern is repeated a suitable number of times each with a progressive shift so as to illuminate substantially the whole of the area in which the character may be expected to be located.

Referring now to FIG. 2, one particular form of scanning cycle is shown in which the first three-line scan group of lines $s1$, $s2$, $s3$ is followed by a second three-line scan group of lines $s4$, $s5$, $s6$ displaced to bring line $s4$ between lines $s1$ and $s2$, line $s5$ between lines $s2$ and $s3$ and so on. This is followed by a further three-line scan group of lines $s7$, $s8$ and $s9$, still further displaced horizontally to the left to bring line $s7$ between lines $s2$ and $s5$. The next three-line scan group of lines $s10$, $s11$ and $s12$ is further horizontally displaced to the left to bring line $s10$ between lines $s5$ and $s3$ and so on.

An alternative scanning scheme is illustrated in FIG. 3 in which the first three-line scan group of lines $s1$, $s2$ and $s3$ is followed by a second scan line group of lines $s4$, $s5$ and $s6$ slightly displaced leftwards respectively from lines $s1$, $s2$ and $s3$, the third three-line scan group of lines $s7$, $s8$ and $s9$ being similarly still further slightly displaced horizontally so that line $s7$ lies adjacent line $s4$, line $s8$ adjacent line $s5$ and line $s9$ adjacent line $s6$ with corresponding displacement of the further scan groups to complete the coverage of the character area.

The use of a three-line scan group has been described by way of example but is clearly not essential. Any desired number of successive scans may be employed to form each spaced scan-line group, the greater the number, the greater the amount of information made available for recognition. Three lines, however, represents a practical number for most applications in view of the electrical time delay and band-width problems involved.

The provision of the various separate and differently delayed versions of the signal obtained during scanning is conveniently achieved by applying such signal to a suitable delay line or delay network having a number of appropriately located tapping points and then using the signals simultaneously available at such tapping points or at an appropriate selection of such points for application to a suitable multiplier circuit. Thus as shown in FIG. 4 a two-term autocorrelation function may be generated by applying the output signals available on lead 10 from a flying spot scanner operating in the manner already described, to the input of a delay device 11 whose delay time is equal to the time taken by the flying spot to move along its scan path from a first position of coincidence with the particular character component being sought to a second chosen position of coincidence with such character component, for example, to the time taken for the scanning spot to travel along its assigned scan path from the point $x1$ to the point $x3$ in FIG. 1. The undelayed signal as available on lead 10 and the delayed signal output from the device 11 are each applied as the respective inputs to a multiplier circuit 12 whose output or product-representing signal after integration forms the identifying function signal.

As shown in FIG. 5, a multi-term auto-correlation function may be achieved in generally similar manner by applying the output signal from the flying spot scanner on lead 10 to a chain of serially arranged delay elements $11a$, $11b$ ... $11n$ which are each of appropriately chosen time delay values. The undelayed signal and each of the delayed signals available at the outputs of the different delay elements are then applied as separate inputs to a multiple-input multiplier circuit 12 whose output forms the required multi-term auto-correlation function signal.

A convenient form of the delay network such as that of 11 in FIG. 4 or those of $11a$ ... $11n$ in FIG. 5, which network must be capable of storing at any one time all of the signals arising from the scanning of the three or other chosen number of complete lines of a scan group (including the flyback periods), in a low unit delay distributed delay cable such as that available as Hackethall cable type HH1500 or type HH2000.

In an arrangement adapted to deal with a number of different characters one or more delay devices, each having a considerable number of tapping points, is needed to permit the appropriate selection of differently delayed signals for allowing identification of different characteristic component parts of the various characters. To facilitate the provision of such tapping points and also to allow the accurate adjustment of each of the delay times, an arrangement using delay cable of the types referred to above is preferably employed since it is possible to provide the equivalent of tappings to such cable without any modification of or permanent attachment to the cable itself.

The nature of such delay cables is such that the magnetic field of the core conductor can be detected outside of the cable body and thus may be sensed by means of a short inductance coil as shown in FIGS. 6 and 7. This adjustable tapping device comprises a very open weave winding 14 of short axial length, say one half-inch, carried upon a thin insulating sleeve 15 of PTFE (polytetrafluoroethylene), which sleeve is itself mounted in a frame 16 also of low loss insulating material. The latter supports a coaxial connector 17 to which the ends of the coil winding 14 are connected. A metal screen 18 covers the exterior of the coil. The sleeve 15 has a bore size such that it is a sliding fit over the outer plastic sheath 19 of the delay cable 20. The latter comprises a helical delay winding 21 around a ferrite core 22 which is reinforced by a central flexible "string" like element. A polythene dielectric layer 23 over the winding 21 is itself covered by the common capacitive member 24 in the form of a plurality of insulated wires laid side-by-side with a slightly helical lay direction. Such a tapping device may be slid up or down the delay cable to provide an infinitely fine adjustment of the delay time value. By using a suitable number of similar devices along the length of the delay cable an effective equivalent of any desired number of tappings may be obtained. The adjustment tapping device desirably feeds an amplifier of low input impedance so that what is, in fact, measured is the current induced in the coil winding 14 which is proportional to the current in the delay cable.

One suitable form of low input impedance tapping or pick-off coil amplifier is show in FIG. 8 and comprises a hybrid circuit of transistor TR and thermionic valves V1, V2 with a feedback network including capacitor C and resistors R between the cathode output point of valve V1 and the input base connection of the transistor TR. Such a circuit can be designed to provide a gain in excess of 6000.

Figure 9:
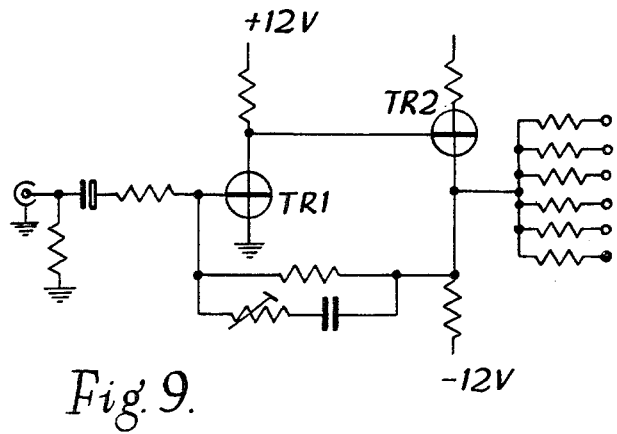
FIGURE 9 is a circuit diagram of one form of distribution amplifier allowing connection of any one delay line tapping point to a number of separate points on the signal correlation means.

Since the output from any delay line tapipng may be required at several points in the correlation means it is necessary to provide some form of distribution amplifier which ensures a low mutual coupling between the respective output terminals feeding the different points of the correlation means. One suitable form of distribution amplifier is shown in FIG. 9 in which the transistors TR1, TR2 are arranged in a conventional "virtual earth" feedback amplifier circuit providing six separate low impedance output connections.

For effecting multiplication of the various delayed signals a variety of different means may be used including a modulated pulse multiplier in which the frequency, amplitude and duty ratio of a pulse train are each controlled by a separate variable corresponding respectively to different ones of the signal inputs to be multiplied. Smoothing of the resultant pulse train provides the required product-representing signals. As an alternative, use may be made of a modulated sine-wave multiplier in which consecutive amplitude and frequency or phase modulation of a sine-wave yields a product-representing signal after demodulation. Further alternatives include use of the quarter squares method or C.R.T. multipliers in which a large uniform spot on the C.R.T. screen is shifted vertically and horizontally by distances proportional respectively to two variable inputs and the difference of the sums of the area of illumination of opposing quadrants then assessed to provide a product-representing signal. Other alternatives are feedback and servo multipliers, heterodyned sine-wave multipliers and Hall effect multipliers.

A preferred method of effecting multiplication of the various delayed signals is to feed the output signals from the scanning means to a logarithmic amplifier thereby to derive signals which are proportional to the logarithm of the signal amplitude; the various differently delayed signals as picked off from the selected tapping points may then be simply added together (or subtracted to provide an inverse or NOT form as referred to previously in connection with FIG. 16) in any suitable manner and thereafter applied to an exponential network to yield a product-representing output signal.

Such logarithmic amplifier may take any of a number of different and already known forms but a convenient arrangement is that illustrated in block schematic form in FIG. 10. This amplifier comprises a number of stages A1, A2, A3 . . . An−1 all of equal gain value up to a chosen maximum or saturation output level which cannot be exceeded and a final stage An having a gain of between 1 and 2 dependent upon the number of preceding stages. The outputs from all stages are added together in an adding circuit 25 but that of the last stage An is fed in antiphase relationship to the remainder so that its output is effectively subtracted with the object of ensuring that for any input less than unity the output is zero. The saturation or maximum output level is shown in FIG. 10 as set by clamping circuits at voltage E for all stages except the last which is clamped at voltage −E. The overall characteristic may be improved by the use in each stage of a long-tailed pair type circuit in which the reference valve is provided with an adjustable D.C. bias viltage on its control grid.

Figure 11:
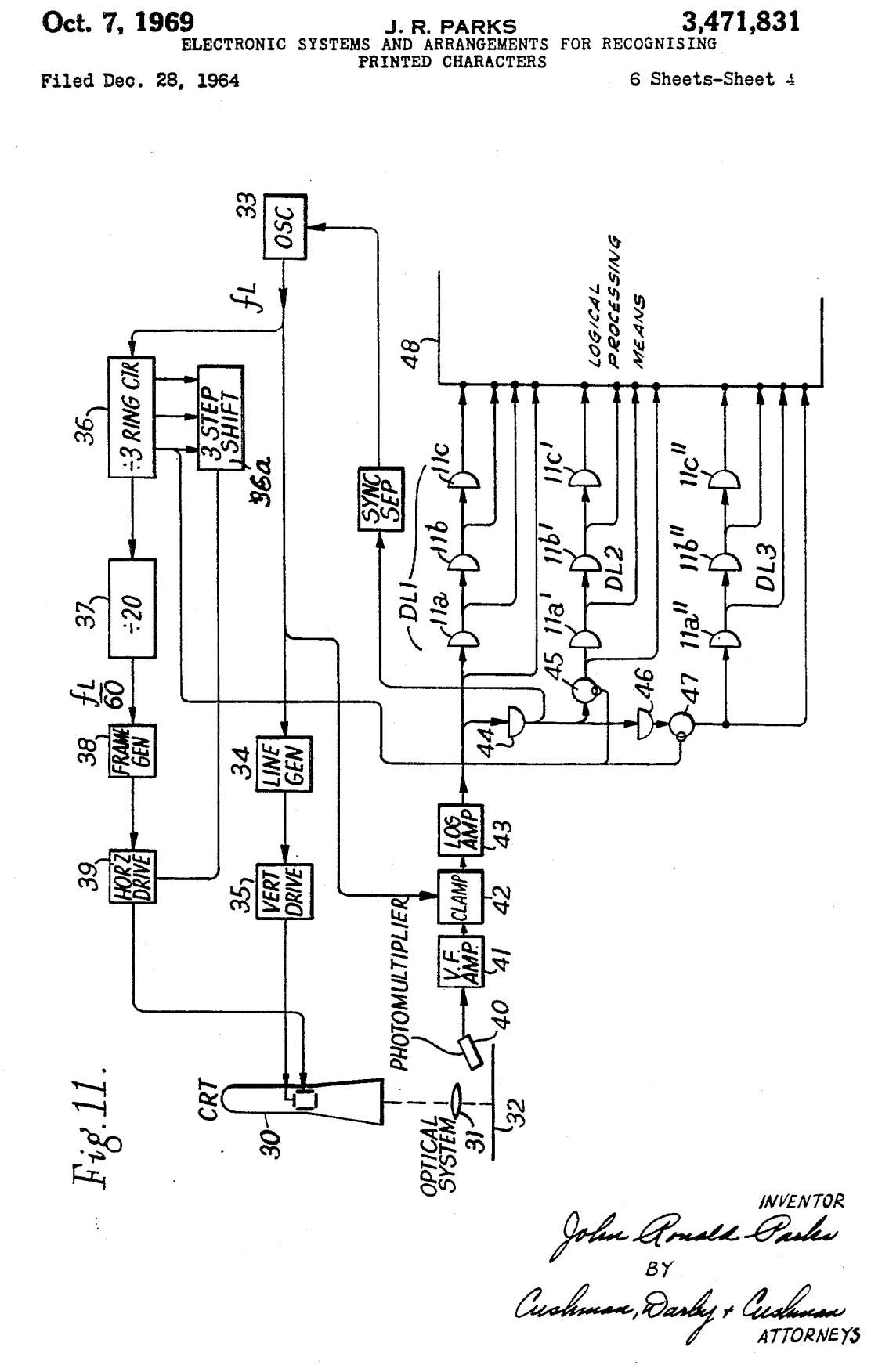

FIG. 11 shows one particular embodiment for the scanning and video processing of printed numerals in which the flying light spot for examining the character-containing area is provided by means of a cathode ray tube 30 and an associated optical system 31 adapted to project a moving light spot formed on the C.R.T. screen on to a surface 32 bearing the character undergoing recognition. The appropriate motion of the C.R.T. beam, necessary to cause the light spot to execute the desired scanning path pattern, is effected by electrostatic or magnetic deflection with deflection voltages or currents derived from an oscillator 33 operating at the line frequency $f_L$. The output of the oscillator 33 is applied to a line scan generator 34 for generating the requisite sawtooth waveform and this in turn feeds a vertical drive amplifier 35 energising the vertical beam deflection plates of the tube 30. The output of the oscillator 33 is also applied as the input of a three stage ring divider circuit 36 whose output at frequency $f_L/3$ is then fed to a further frequency divider circuit 37 having a divide factor of 20. The output of the latter, the frequency $f_L/60$, is used to operate a frame scan generator 38 for generating a suitable saw-tooth waveform which, through a horizontal drive circuit 39, energises the horizontal beam deflection plates of the tube 30. To provide the interleaved pattern of three successive and relatively widely spaced line scans in each scan line group, the outputs from each of the three stages of the ring divider circuit 36 are applied to a step waveform generator 36a which provides a three-step waveform output which is used in the horizontal drive circuit 39 to impose the requisite horizontal shift between the three successive line scans of each group.

The whole of the scanned area of the surface 32 bearing the character under recognition is continuously viewed by a photomultiplier tube 40 whose output is fed to a video amplifier 41. The output from such amplifier 41 is then fed through a clamp or black-out circuit 42 to a logarithmic amplifier 43 which may be of the form already referred to with reference to FIG. 10. The output from this amplifier is then fed directly to a first delay chain DL1 of delay sections 11a, 11b, 11c whose total delay time is equal to the time of one line scan period (plus flyback). The amplifier output is also fed through a further delay device 44 having a delay time equal to the one-line scan period (plus flyback) and by way of a gate circuit 45 to a second delay chain DL2 of delay sections 11a′, 11b′, 11c′ similar to the delay chain DL1. The delayed waveform output from the delay device 44 is also fed by way of a further delay device 46, of the same one-line delay time as the delay device 44, and a subsequent gate circuit 47 to a further delay chain DL3 of delay sections 11a″, 11b″ and 11c″, again similar to the delay chain DL1. Each delay chain may be a length of delay cable as already described with adjustable tapping devices as shown in FIGS. 6 and 7.

The gate circuits 45 and 47 are controlled by one of the stage outputs from the ring divider circuit 36 e.g. that of the third stage, to ensure that the signals available for simultaneous sampling in the different delay chains do not contain signals arising from the scanning of lines in two different three-line scan groups.

Thus, when the gates 45 and 47 are controlled as shown by the output from the third stage of the ring divider circuit 36 (coincident in timing with the execution of the third or last line scan of each three-line group) all line scan signals of all of the successive groups will be fed to the first delay chain DL1 but only those of the second line scan of each group will be fed to the second delay chain DL2 (owing to the presence of the delay device 44) and only those of the first line scan of each group will be fed to the third delay chain DL3 (owing to the presence of the two successive delay devices 44 and 46).

The signals resulting from the sampling of the delay chains are processed in the logical circuits or other suitable means indicated schematically at 48 to form a plurality of different auto-correlation function signals related respectively to the range of different geometrical feature shapes.

Such means includes (as described later with reference to FIG. 12) analogue adding circuits for mixing or adding (or subtracting in the case where the above described inverse technique is used) the various selected and differently delayed output signals from the delay chains. These are followed by anti-logarithmic amplifiers to complete the multiplication (or division) operation and provide a series of product-representing outputs which form the said auto-correlation function signals related respectively to the different characteristic regions of the numerals of the range being examined for recognition. These auto-correlation function signals are then correlated in various different combinations appropriate to the standard form of each of different characters of the range capable of being recognized. Thus, for example, the auto-correlation signal representing the presence of a curved region such as that at the upper part of the numeral "2" of FIG. 1 and another auto-correlation signal representing the presence of a rectilinear and inclined region as shown by the middle limb portion of the said numeral "2" shown in FIG. 1 and a third auto-correlation function signal representing the presence of a horizontal limb portion as shown at the bottom of the said numeral "2" in FIG. 1 may be applied to coincidence testing means such as a logical AND gate, any signal output from the latter being used as an output signal indicating recognition of numeral "2."

Such logical circuit arrangements for effecting recognition by coincidence of different applied signals are well known in the data processing art and appropriate apparatus arrangements are already well established in many devices, particularly in magnetic ink character recognition arrangements.

Although only three separate delay sections are shown in each delay chain, it will be understood that any desired number of separate tappings may be taken from each delay chain and conveniently these are of the infinitely adjustable type as described above with reference to FIGS. 6 and 7. The arrangement described having three delay sections may be extended by adding a fourth delay section into which the sampled sections discharge so that they are cleared for the reception of further information derived from continuing character scanning.

Instead of supplying the three separate one-line scan delay chains DL1, DL2 and DL3 in parallel from the logarithmic amplifier 43 through the additional delays 44 and 46, the latter may be dispensed with by arranging the three delay chains in series with suitably inserted gate circuits, amplifiers and pre-emphasis circuits.

Figure 12:
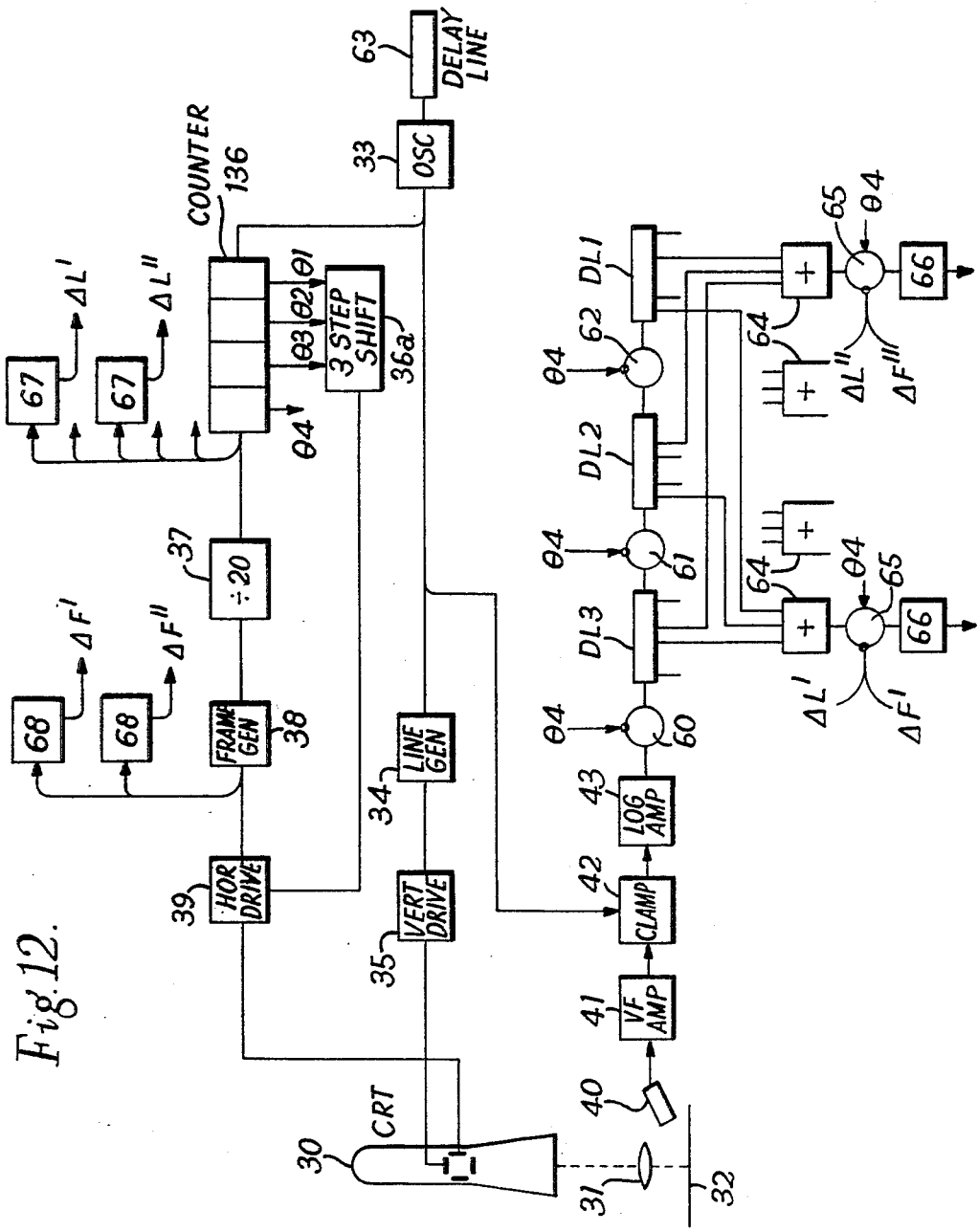
FIGURE 12 is a similar block schematic diagram of an alternative arrangement to that shown in FIG. 11.

One arrangement of this kind is shown in block schematic form in FIG. 12 and comprises a cathode ray tube 30 and an associated optical system 31 for projecting the scanning light spot on to the character-bearing surface 32 as in the previous arrangement shown in FIG. 11. Deflection of the tube beam in the line scanning direction is again effected by current or voltage waveforms derived from a line frequency oscillator 33 through a line scan generator 34 and a vertical drive amplifier 35. The oscillator output is also applied to a four-stage counter circuit 136 to provide separate outputs $\theta 1$, $\theta 2$, $\theta 3$ and $\theta 4$ defining respectively four successive line scan plus flyback periods. The outputs $\theta 1$, $\theta 2$, $\theta 3$ are applied to a three-step waveform generator 36a for operation as in the previous embodiment in conjunction with the other horizontal or frame scan circuits 37, 38 and 39.

As in the previous arrangement the output signals from a photomultiplier tube 40 viewing the scanned character-bearing surface 32 are fed by way of amplifier 41 and clamp circuit 42 to a logarithmic amplifier 43. The output from this amplifier is fed by way of a gate circuit 60 to a multi-tapped delay line section DL3 and the output from the latter is similarly fed through a gate circuit 61 to a second multi-tapped delay line section DL2 and the output therefrom likewise fed through a gate circuit 62 to a further multi-tapped delay line section DL1.

The three delay line sections each have a delay time equal to one line scan plus flyback so that at the end of the third line scan time of any one group, the signals due to line 1 scan will be in delay line section DL1, those of line 2 in delay line section DL2 and those of line 3 in delay line section DL3. The gate circuits 60, 61 and 62 are all controlled by the output $\theta 4$ of the counter 136 to be closed during the following, fourth, line scan period as determined by the counter so that only those signals which are related to the three separate line scans will be available for sampling at the different tapping points during the whole of said $\theta 4$ period.

The appropriate, delayed signal, samples from the delay line sections chosen in accordance with the different characteristic character components being tested for are applied to various analogue adding (or adding and subtracting) and anti-logarithmic circuits 64 whose outputs are each fed through an associated gate circuit 65 to a related integrator or summing amplifier 66. The gate circuits 65 are each controlled by the $\theta 4$ signal to be open only during the $\theta 4$ period following the completion of the third line scan of each three line group. In many instances, due to the particular selection of different delayed signals and/or the need to restrict the effective area of a character to be examined for the presence of a particular characteristic, a considerable proportion of the signals available from the different delay line sections during each successive $\theta 4$ period are not required to be examined at all and similarly the signals available during certain three-line scan groups of the complete raster period need not or even should not be examined. Advantage may be taken of these conditions to improve the signal to noise ratio of the systems and the precision of the eventual integrated output signals by inhibiting the opening of the related gate circuit 65 during the relevant times by means of further waveforms $\Delta_L$ and $\Delta_F$ derived respectively from monostable trigger circuits 67, 68 which are arranged to be triggered on at the beginning of each $\theta 4$ period and each frame scan period respectively. The relaxation or reset times of these circuits are adjustable and are set in accordance with the blanking-out periods required.

In this embodiment the oscillator 33 is stabilised and synchronised at the correct repetition frequency by means of pulse reflection in a length of delay line 63 identical with each of the sections DL1, DL2, DL3 to provide automatic compensation for temperature changes.

Figure 13:
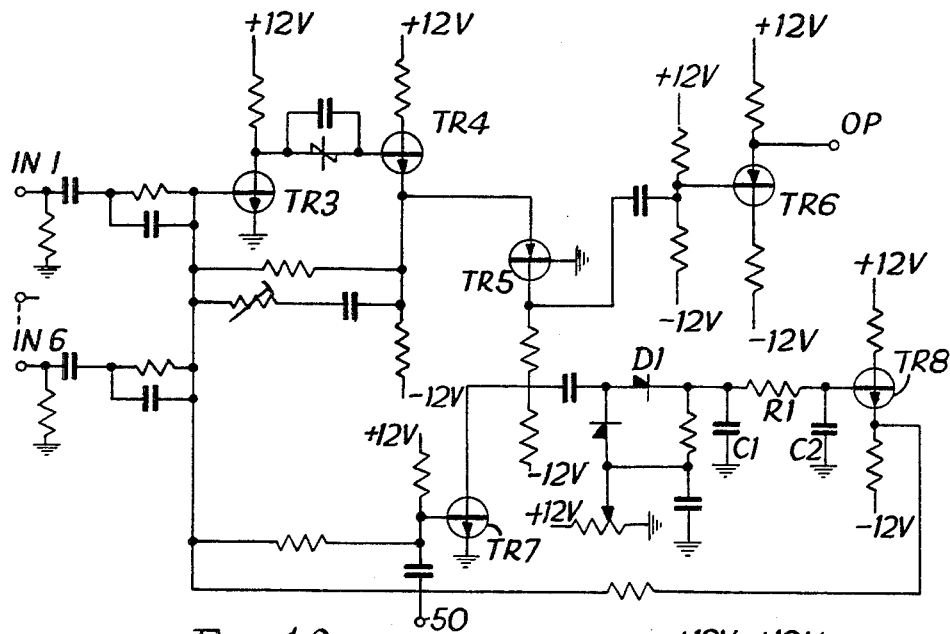
FIGURE 13 is a circuit diagram of one form of analogue adder and antilog amplifier.

FIGURE 13 shows one form of analogue adding and anti-logarithmic amplifier circuit in which provision is made for up to six separate inputs IN1 . . . IN6 from different tapping points on the delay chains feeding a further "virtual earth" circuit including transistors TR3, TR4 in order to offer a low transfer impedance between the input terminals.

The required anti-logarithmic characteristic of the subsequent amplifier is obtained by the use of a semi-conductor junction as a non-linear (exponential) element. The transistor TR5 (for example, of type AFZ 12) selected for use is connected as a grounded base amplifier with its emitter voltage fed from the low impedance output of the adding amplifier circuit noted above and its collector output fed by way of transistor TR6 to the output terminal OP.

It is necessary for the static conditions of the exponential device to be well stabilised in order to avoid scaling errors while it is also necessary to compensate the loss of the D.C. component of the input signals due to the input A.C. couplings. A D.C. feedback system is accordingly provided by way of switching transistor TR7, rectifier diode D1 and transistor TR8. The operation of the compensation depends upon the regular occurrence of zero signals in all inputs to the adder simultaneously. During this time the output of the exponential device is compared with a reference potential and any error, after passage through a low pass filter of resistor R1 and capacitors C1, C2, is amplified by transistor TR8 and fed back as a correcting signal to the virtual earth point of the adder at the base of transistor TR3. The requisite zero signal conditions occur reliably during the frame flyback period between each completed scan coverage of the character area, at which time the gate transistor TR7 is made non-conductive by the application of a suitable sampling pulse to the terminal 50.

Figure 14:
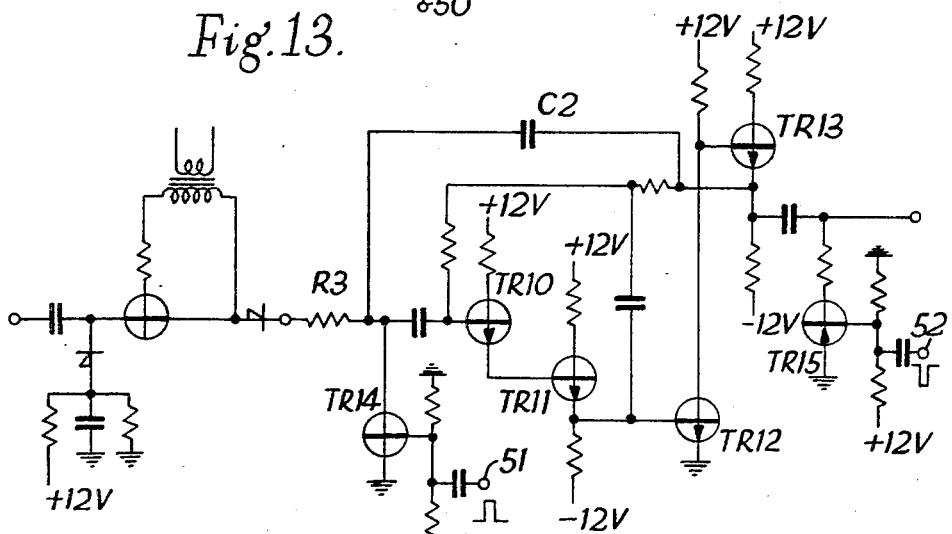
FIGURE 14 is a circuit diagram of one form of integrator or summing amplifier for providing a sustained output signal in response to any transient peak signal arriving during the scan cycle and indicating the presence of a particular characteristic feature of the character under recognition.

FIGURE 14 shows one form of an integrator or summing amplifier for providing a sustained output signal in the event of the occurrence of any peak output from the associated adding and anti-logarithmic amplifier circuit (indicative of recognition of the characteristic feature sought by the particular auto-correlation arrangements connected to the adding circuit) during the complete examination period. Such integrator comprises a conventional resistance-capacitance integrator circuit including the capacitance C2 and resistance R3 with a linearizing amplifier of transistors TR10 . . . TR13. Provision is made for effecting rapid discharge of the integrated capacitance charge by way of transistors TR14 and TR15 which are controlled by means of clearance pulses applied to the terminals 51 and 52.

As an alternative to the simple cathode ray tube projection scheme shown in FIGS. 11 or 12, the modified arrangement shown in FIG. 15 may be employed in which the raster trace of the C.R.T. scanning tube means is projected on to the character bearing surface 32 by an optical system 31 set into a photometric integrating sphere 50 having a whitened internal surface. The photomultiplier sensing tube 40 is likewise set into a side region of the wall of such sphere. By this means a greatly increased signal output is obtainable. Subsequent to the photomultiplier it is desirable to have circuit arrangements for standardising the signal amplitude, for effecting sense inversion and for establishing a suitable black level and peak white level of signal.

With a view to avoiding or reducing any unwanted variation of the output from the sensing tube 40 due to variation or flicker in the character illumination provided by the C.R.T., the light from the screen of the latter may be monitored and stabilized by collecting stray light as by means of mirrors and diverting it to a monitoring photo-multiplier tube whose output, after amplification, is applied to the control or gun electrode of the C.R.T. to provide a light stabilizing medium.

It will be understood that the various delay times of the different signals used for effecting auto-correlation need to be chosen to suit the particular style, shape and size of the characters under recognition and in order to facilitate adaptation of the arrangements to use with different styles of characters it is preferable to provide a large number of different delay tappings and to arrange for the appropriate selection from among these according to the character style by suitable switch means such as a plug board.

I claim:

1. In apparatus for effecting recognition of printed characters by logical correlation of auto-correlation electric function signals representing the presence or absence within the examined character of character features of different geometrical shapes, an arrangement for deriving such auto-correlation function signals which comprises electro-optical examination means for examining a field area containing the character to be recognized by scanning movement of a spot-form examination area over a predetermined scan path pattern, electric signal generating means for developing a first analogue-form electric signal wave-form whose varying amplitude with time represents the changing optical characteristics of the examined character and background areas traversed by said examination area in its movement along said scan path, electric signal delay means comprising an electromagnetic delay line provided with a plurality of signal tapping points for use in selected combinations for the recognition of different characteristic features of a range of different characters and of cable form and of a type in which the magnetic field of the core conductor is manifest outside the cable body and in which means for providing a tapping point connection comprise an inductive winding around the outside of the cable body, said delay means being connected to be supplied with said first signal to provide at least one further and corresponding analogue-form electric signal which is time delayed relative to said first signal by a delay time of predetermined value and electric signal multiplier means connected to be supplied with said first signal and at least one of said further signals to form an auto-correlation function signal whose amplitude at any time represents the product of the respective amplitude values of the differently delayed signals applied thereto at corresponding time instants.

2. Apparatus according to claim 1 in which said inductive winding is arranged to be movable along the length of the delay cable to provide infinite adjustability of the tapping point.

3. In apparatus for effecting recognition of printed characters by logical correlation of auto-correlation electric function signals representing the presence or absence within the examined character of character features of different geometrical shapes, and arrangement for deriving such auto-correlation function signals which comprises electro-optical examination means including scanning means for moving said spot-form examination area over a raster-form scan path pattern comprising a plurality of spaced parallel rectilinear path lines which are traversed in succession by said examination area in the same direction and at the same speed so that said raster pattern is made up of successive line groups each of $n$ successive lines spaced widely from one another with a progressive shift at right angles to the line direction between the first and second line positions of the immediately preceding group for examining a field area containing the character to be recognized by scanning movement of a spot-form examination area over a predetermined scan path pattern, electric signal generating means for developing a first analogue-form electric signal wave-form whose varying amplitude with time represents the changing optical characteristics of the examined character and background areas traversed by said examination area in its movement along said scan path, electric signal delay means connected to be supplied with said first signal to provide at least one further and corresponding analogue-form electric signal which is time delayed relative to said first signal by a delay time of predetermined value and electric signal multiplier means connected to be supplied with said first signal and at least one of said further signals to form an auto-correlation function signal whose amplitude at any time represents the produce of the respective amplitude values of the differently delayed signals applied thereto at corresponding time instants.

4. An arrangement according to claim 1 in which said electro-optical examination means includes scanning means for moving said spot-form examination area over a raster-form scan path pattern comprising a plurality of spaced parallel rectilinear path lines which are traversed in succession by said examination area in the same direction and at the same speed.

5. An arrangement according to claim 4 in which said electro-optical examination means comprises an optical device for illuminating said field area by scanning movement of a light spot.

6. An arrangement according to claim 5 in which said electro-optical examination means comprise a cathode ray tube, tube beam deflecting means for causing deflection of the tube beam such that the screen light spot executes movement along the chosen scan path pattern and optical means for projecting said screen light spot on to said field area.

7. In apparatus for effecting recognition of printed characters by logical correlation of auto-correlation electric function signals representing the presence or absence within the examined character of character features of different geometrical shapes, and arrangement for deriving such auto-correlation function signals which comprises electro-optical examination means including scanning means for moving said spot-form examination area over a raster-form scan path pattern comprising a plurality of spaced parallel rectilinear path lines which are traversed in succession by said examination area in the same direction and at the same speed, an optical device for illuminating said field area by scanning movement of a light spot, a cathode ray tube, tube deflecting means for causing deflection of the tube beam such that the screen light source executes movement along the chosen path pattern and optical means for projecting said screen light spot onto said field area for examining a field area containing the character to be recognized by scanning movement of a spot-form examination area over a predetermined scan path pattern, electric signal generating means including photoelectric means subjected to light reflected from said field area and in which said multiplier means comprise a logarithmic amplifier connected to be supplied with the signal output from said photoelectric means, the output from said logarithmic amplifier forming said first electric signal waveform, a signal adding circuit connected to receive said first and further signals and an anti-logarithmic amplifier circuit connected to receive the output from said adding circuit, the output from said anti-logarithmic amplifier circuit forming said derived auto-correlation function signal for developing a first analogue-form electric signal waveform whose varying amplitude with time represents the changing optical characteristics of the examined character and background area traversed by said examination area in its movement along said scan path, electrical signal delay means connected to be supplied with said first signal to provide at least one further and corresponding analogue-form electric signal which is time delayed relative to said first signal by a delay time of predetermined value, and electric signal multiplier means connected to be supplied with said first signal and at least one of said further signals to form an auto-correlation function signal whose amplitude at any time represents the product of the respective amplitude values of the differently delayed signals applied thereto at corresponding time instants.

8. An arrangement according to claim 7 which includes electric signal integrating circuit means connected to receive the output from said anti-logarithmic amplifier circuit to retain a record of any significant output amplitude in said derived auto-correlation function signal at least until the end of each scanning operation by said examination means.

9. In apparatus for effecting recognition of printed characters by logical correlation of auto-correlation electric function signals representing the presence or absence within the examined character of character features of different geometrical shapes, an arrangement for deriving such auto-correlation function signals which comprises electro-optical examination means for examining a field area containing a character to be recognized by scanning movement of a spot-form examination area over a predetermined scan path pattern electric signal generating means including a logarithmic amplifier for developing a first analogue-form electric signal waveform whose varying amplitude with time represents on a logarithmic scale the changing optical characteristics of the examined character and background areas traversed by said examination area in its movement along said scan path, electric signal delay means connected to be supplied with said first signal to provide at least one further and corresponding analogue form electric signal which is time-delayed relative to said first signal by a delay time of predetermined value, an electric signal adding circuit connected to receive said first and said further signals and providing an output signal waveform whose varying amplitude with time represents the sum of the instantaneous amplitude values of said first and said further signals and an anti-logarithmic amplifier connected to be supplied with the output from said signal adding circuit, the output from said anti-logarithmic amplifier circuit forming the required auto-correlation function signal.

10. An arrangement according to claim 9 in which said electro-optical examination means includes scanning means for moving said spot-form examination area over a raster-form scan path pattern comprising a plurality of spaced parallel rectilinear path lines which are traversed in succession by said examination area in the same direction and at the same speed.

11. An arrangement according to claim 10 in which said electro-optical examination means comprises an optical device for illuminating said field area by scanning movement of a light spot.

12. An arrangement according to claim 11 in which said electro-optical examination means comprise a cathode ray tube, tube beam deflecting means for causing deflection of the tube beam such that the screen light spot executes movement along the chosen scan path pattern and optical means for projecting said screen light spot on to said field area.

13. An arrangement according to claim 12 in which said electric signal generating means comprises photoelectric means subjected to light reflected from said field area.

14. An arrangement according to claim 13 which includes electric signal integrating circuit means connected to receive the output from said anti-logarithmic amplifier to retain a record of any significant output amplitude in said derived auto-correlation function signal at least until the end of each scanning operation by said examination means.

References Cited

UNITED STATES PATENTS

| | | | |
|---|---|---|---|
| 3,000,000 | 9/1961 | Eldredge | 340—146.3 |
| 3,038,069 | 6/1962 | Tuller | 250—20 |
| 3,215,981 | 11/1965 | Golay | 340—146.3 |
| 3,196,397 | 7/1965 | Goldstine et al. | 340—146.3 |

MAYNARD R. WILBUR, Primary Examiner

R. F. GNUSE, Assistant Examiner

U.S. Cl. X.R.

235—181